United States Patent [19]

Okada et al.

[11] 3,727,860

[45] Apr. 17, 1973

[54] CONTROL ARRANGEMENT FOR TAPE RECORDERS

[75] Inventors: Osamu Okada, Tokyo; Yuuji Mihori, Yokohama, both of Japan

[73] Assignee: Amerex Electronics Corp., New York, N.Y.

[22] Filed: Nov. 11, 1971

[21] Appl. No.: 197,784

[30] Foreign Application Priority Data

Nov. 12, 1970 Japan ..............................45/112410

[52] U.S. Cl. ....................................242/208, 274/4 R

[51] Int. Cl. ............................B11b 15/32, G03b 1/04

[58] Field of Search..............242/187–190, 208, 209; 274/4 R, 4 D, 11 D

[56] References Cited

UNITED STATES PATENTS 2,896,945 7/1959 Waldman ..............................242/206

3,282,522 11/1966 Louzil ..................................242/209

3,323,738 6/1967 Hoag....................................242/209

3,350,024 10/1967 Karecki ................................242/208

*Primary Examiner*—Leonard D. Christian

*Attorney*—Maxwell E. Sparrow et al.

[57] ABSTRACT

An arrangement for controlling the modes of operation of a tape recorder through displacement of a lever carrying the pinch roller, to predetermined positions. The free end of the lever is linked to a slide member carrying the indexing pin designed to operate with three spaced indentations on a stop lever. The stop lever has a projection which is brought into the path of motion of a sprocket-shaped rotary member which supports a magnetic tape reel, when the tape recorder is actuated so as to be in the stop position.

10 Claims, 4 Drawing Figures

CONTROL ARRANGEMENT FOR TAPE RECORDERS

BACKGROUND OF THE INVENTION

Heretofore, tape recorders were operated with substantially complex controlling mechanisms, whereby the tape rewinding, recording, playback and stopping modes of operation were controlled by respective independent pushbuttons or rotary switches. In view of such complex arrangement of mechanisms for operating tape recorders, they have the disadvantage that they cannot be manufactured at low cost and in substantially small and compact units. Furthermore, slackening the tape in recorders is often incurred while the recorder is in stopped position.

In view of the increased use of tape recorders, it is desirable that they be readily transportable by being small and compact, and that they be readily operable without requiring a number of pushbuttons or different actuating mechanisms for the different modes of operation of the recorder.

SUMMARY OF THE INVENTION

Accordingly it is an object of the present invention to provide an arrangement for controlling the operation of a tape recorder which is simple in contruction, and is substantially small and compact.

It is a further object of the present invention to provide an arrangement as set forth, which may be readily maintained.

It is a still further object of the present invention to provide an arrangement according to the foregoing character which may be economically fabricated.

The objects of the present invention are achieved by providing an arrangement by which a lever, used to carry the pinch roller for pressing against the capstan of the tape recorder, is displaced to predetermined positions for carrying out the different modes of operation of the recorder. The free end of the lever is linked to a slide member carrying a stop or indexing pin. This pin cooperates with indentations on a stopping lever which carries a tooth-shaped projection. This projection on the stopping lever is designed to engage sprocket-shaped teeth on the rim of a reel supporting plate. When the indexing pin 20 is in one of the predetermined indentations of the stop lever, the projection on the stop lever is moved into the path of motion of this sprocket and the reel supporting plate is substantially instantaneously stopped so that the reel is held stationery and slackening of the tape is prevented.

Various further and more specific purposes, features and advantages will clearly appear from the detailed description given below taken in connection with the accompanying drawing which forms part of this specification and illustrates merely by way of example one embodiment of the apparatus of the invention.

BRIEF DESCRIPTION OF THE DRAWING

In the following description and in the claims, parts will be identified by specific names for convenience, but such names are intended to be as generic in their application to similar parts as the art will permit. Like reference characters denote like parts in the figures of the drawing, in which

DESCRIPTION OF THE PREFERRED EMBODIMENTS

Figure 1:
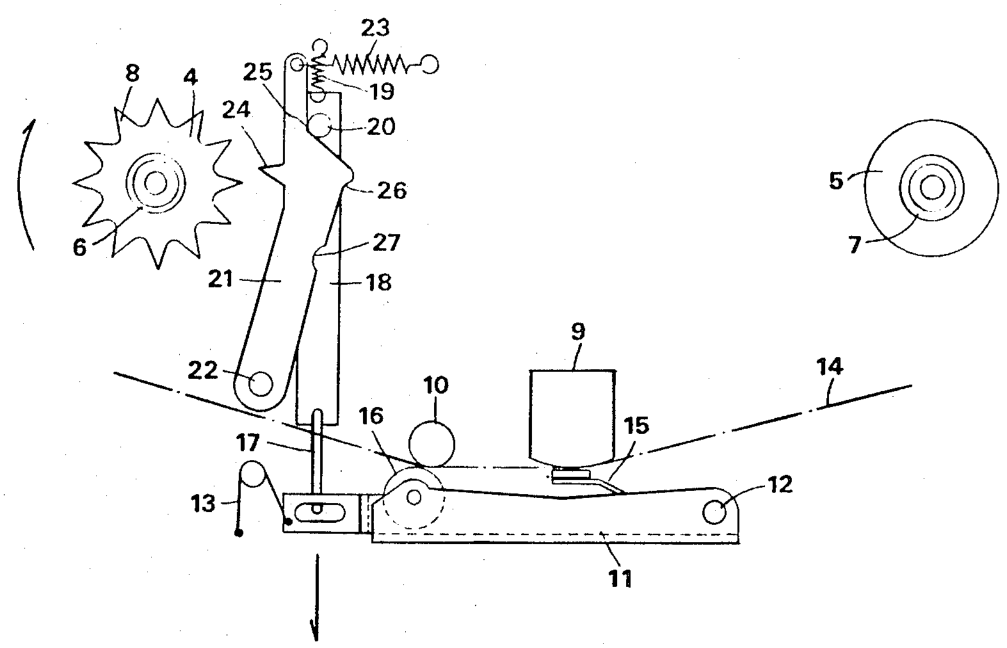
FIG. 1 is a plan view of the controlling mechanism of the tape recorder, in accordance with the present invention, when the tape recorder is in the recording or playback modes of operation.
Figure 2:
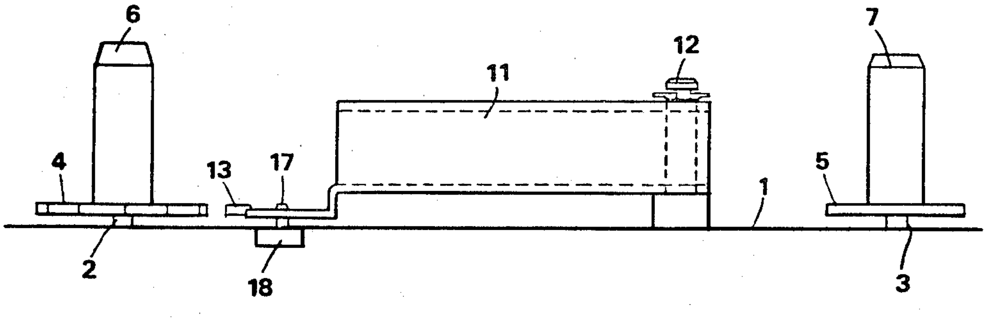
FIG. 2 is a front view of the assembly of FIG. 1.

Referring now in more detail to the drawing illustrating preferred embodiments by which the invention may be realized, a base plate or board 1 of the tape recorder has mounted on it two revolving shafts 2 and 3 for carrying reels of magnetic tape. The reel supporting plates 4 and 5, as well as the reel insertion shafts 6 and 7 are secured to the upper ends of the revolving shafts 2 and 3, with the same amount of friction. The rim of one of the reel supporting plates 4 has tooth-shaped projections as, for example, sprocket teeth or gear teeth. At one side of the magnetic head 9 of the recorder, is a driving capstan 10. A lever 11 for carrying the pinch roller 16 is pivoted about the pivot 12. A spring 13 serves to maintain the pinch roller 16 pressed against the capstan 10 by urging the lever 11 to rotate in that respective direction. The magnetic tape 14 passes between the capstan 10 and the pinch roller 16, and is transported as a result of the pressure applied between these two elements of the tape recorder. A pressure element 15 mounted on the inside of the lever 11, furthermore, serves to press the magnetic tape against the magnetic head 9.

The free end of the lever 11 which is connected to the spring 13, is linked to one end of a rod 17 which, in turn, has its other end connected to a slide member 18. A spring 19 in the form of a tension spring, acts on the lever 18 at the end opposite to that at which the rod 17 is connected. A stop pin 20 is mounted on the lever 18 and projects from its surface at the top.

A stopping lever 21 is freely rotatable about the pivot 22, and is pulled towards the sliding member 18 by a spring 23. One edge of the stopping lever 21 has a tooth-shaped projection 24 which engages with the tooth-shaped projections on the reel supporting plate 24. The other edge of the stopping lever 21 has 3 indentations 25, 26 and 27 into which the stop pin 20 may drop.

In operation of the tape recorder as shown in FIG. 1 during recording or playback, the lever 11 for carrying the pinch roller is pressed toward the magnetic head 9, by the spring 13. In this position of the lever 11, the stop or abutting pin 20 on the slide member 18 is in contact with the first indentation 25 of the stop lever 21. With the pin 20 in this position in which it contacts the indentation 25, the tooth-shaped projection 24 on the lever 21 does not contact the teeth 8 on the reel supporting plate 4.

When the lever 11 for carrying the pinch roller 16 is in the position shown in FIG. 1, the revolving shaft 2 is rotated clockwise when viewed from the plan view of FIG. 1. Such rotation of the shaft 2 is accomplished through a mechanism, not shown, which is coupled to the lever 11. In this manner of rotation of the shaft 2, the tape 14 on the reel, not shown, is moved from right to left during recording or playback.

Figure 4:
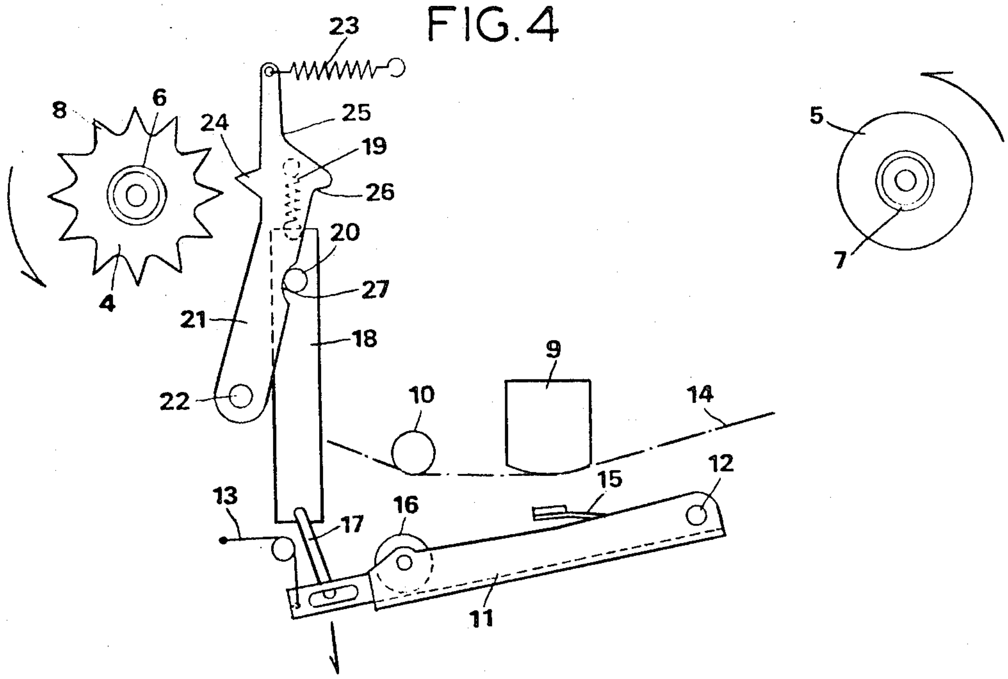
FIG. 4 is a plan view of the controlling mechanism when the recorder is in the rewind mode of operation.

FIG. 4 shows the positions of the operating elements of the tape recorder when the tape 14 is being rewound or the tape recorder is in the rewind state. When the lever 11 is rotated either manually or mechanically in the direction so that it moves away from the magnetic head 9, against the action of the spring 13, the slide member 18 becomes pulled by the lever 11 as a result of being connected to the rod 17. As a result of this positioning of the slide member 18 through the lever 11, the stop or indexing pin 20 forces the stop lever 21 toward the reel supporting plate 4. When the slide member 18 has been pulled sufficiently by the lever 11, the stop lever 21 is returned to its initial position and out of engagement of the reel supporting plate 4, as a result of the condition that the pin 20 is brought into contact with the indentation 27 which is the third indentation. The spring 23 serves to pull the stop lever 21 out of contact with the reel supporting plate 4, and to cause the lever 21 to bear against the stop pin 20 along its indentation 27. The lever 21 reaches the position shown in FIG. 4, in which the stop or indexing pin engages the indentation 27, by way of the second indentation 26. In this position of FIG. 4, in which the third indentation 27 rests against the pin 20, the tooth-shaped projection 24 on the lever 21 is out of the path of motion of the teeth 8, and therefore, the lever 21 does not contact the reel supporting plate 4. In the position of lever 11 shown in FIG. 4, the reel revolving shaft 2 is disconnected from the mechanism which is coupled to the lever 11 for moving the tape 14 during record or playback modes of operation. At the same time, the other reel rotating shaft 3 is connected to the driving unit of the tape recorder, so that it may be rotated at a substantially higher speed so as to result in substantially high rewind speed of the tape 14.

Figure 3:
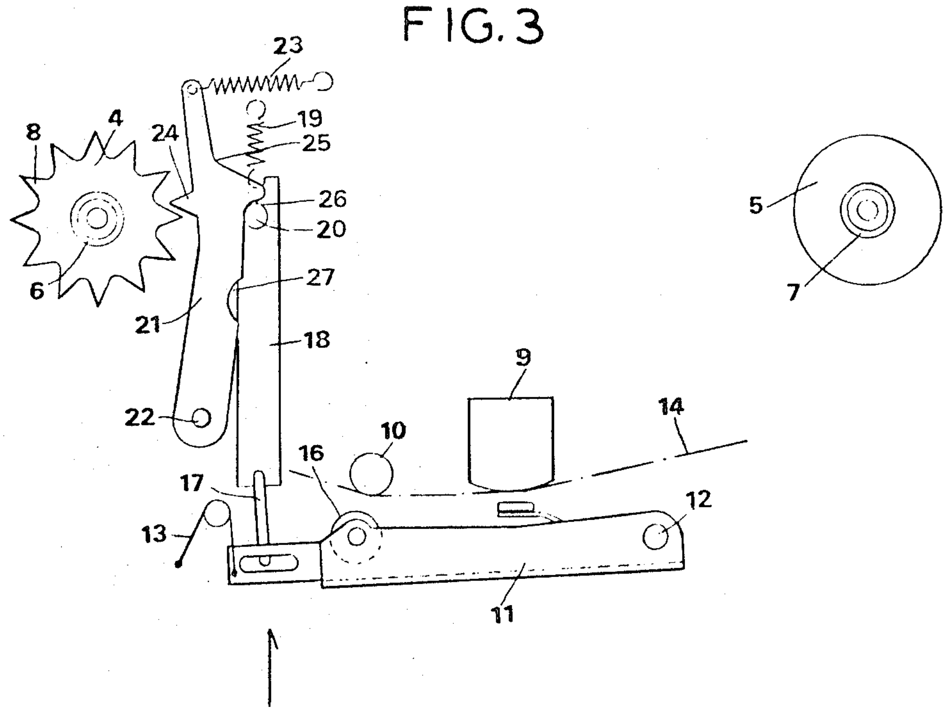
FIG. 3 is a plan view of the controlling mechanism when the tape recorder is in stopped position.

When the operating parts of the tape recorder are in the positions shown in FIG. 3, the tape recorder is stopped from operating. In this state of the tape recorder, the lever 11 is positioned at an intermediate location toward the head 9, and the indexing pin 20 is in contact with the second indentation 26 on the slide member 18. In this position of the lever 11 and lever 21, both rotatable reel shafts 2 and 3 are disconnected from the driving unit of the tape recorder, by being released from the mechanism linked with the lever 11. In this position of the lever 21, furthermore, when the indexing pin bears against the indentation 26, the tooth-shaped projection on the lever 21 is moved within the path of motion of the teeth or pojection 8 of the reel supporting plate 4. By thus being displaced within the path of motion of the teeth 8, the projection 24 serves to hold the reels of the tape recorder stationary.

In the embodiment shown in FIG. 3, the tape recorder is held forcibly in stopped position as a result of the tooth projection 24 meshing with the teeth 8 on the reel supporting plate 4. This stopping arrangement may be replaced with one in which a plate is mounted on the lever 21 in place of the tooth projection 24, and this plate is then pressed against the supporting plate 4 which has a circular shaped rim instead of the tooth-shaped projections. Thus, the reel supporting plate 4 has an outer rim which has a circular-shaped cross section, and this circular-shaped member 4 is then held in place through frictional force applied by the plate mounted on the stop lever 21. In order to obtain the required frictional force between the plate on lever 21 and the outer rim of the plate 4, frictional material such as rubber, for example, may be applied to the surfaces of the outer rim of the plate 4, or on the surface of the plate mounted on to the lever 21.

In view of the arrangement of the present invention as is described above, simple operation of the lever 11 for carrying the pinch roller will connect or disconnect the recording/playback reels supporting plate 4 and the rewind reels supporting plate 5, from the driving unit of the tape recorder. Thus, the tape recorder can be set to recording/playback, rewind, and stop modes of operation through simple displacement of the lever 11, and as a result the operation of the tape recorder may be carried out in a simple manner.

When the tape recorder is placed into the stop position, the indexing pin 20 on the slide member 18 moves in relation to the stop lever 21 so that the latter has its projection 24 brought into the path of motion of the projection 8, with the result that the reel supporting plate 4 is substantially stopped instantaneously. In view of this feature, further rotation of the reel, after the tape recorder has been transferred to the stop position, is not incurred as a result of the inertia present in the movable parts. By instantaneously stopping the reel from further rotatable motion, slackening of the tape and its possible entanglement thereby is prevented.

In view of the simple mechanism and method of operating the tape recorder, the tape recorder may be constructed as a small and compact unit, at substantially low cost.

While the invention has been described and illustrated with respect to certain preferred examples which give satisfactory results, it will be understood by those skilled in the art after understanding the principle of the invention, that various other changes and modifications may be made without department from the spirit of the invention.

What is claimed is:

1. An arrangement for controlling the operation of a tape recorder comprising, in combination, a first lever pivoted at one end and having a free end; a linearly moving member linked to said free end of said first lever; a pin member mounted on said linearly moving member and moving therewith when displaced through displacement of said first lever; a second lever pivoted in proximity to said linearly moving member and engaging said pin member in predetermined positions of said pin member; and a rotatable member rotatably mounted in proximity to said second lever for supporting a tape reel, said rotatable member being contacted by said second lever and held stationary when said first lever and thereby said pin member is in a predetermined position.

2. The arrangement as defined in claim 1 including tooth-shaped projection means on said second lever; and toothshaped projections on the periphery of said rotatable member for engaging said tooth-shaped member when said rotatable member is held stationery and said first lever and said pin member are in said predetermined positions.

3. The arrangement as defined in claim 1 wherein said second lever has an indentation bearing against said pin member when said pin member and said first lever are in said predetermined position for holding stationary said rotatable member.

4. The arrangement as defined in claim 3 wherein said second lever has two further indentations, one of said further indentations bearing against said pin member when said tape recorder i in the recording or playback mode of operation and the other one of said further indentations bearing against said pin member when said tape recorder is in the rewind mode of operation.

5. The arrangement as defined in claim 1 including a roller member rotatably mounted on said free end of said first lever; and a driving capstan cooperating with said roller member for moving linearly the tape in said tape recorder when said first lever is in a position whereby said roller member presses said tape against said capstan.

6. The arrangement as defined in claim 1 including a first spring connected to said second lever and forcing said second lever against said pin member.

7. The arrangement as defined in claim 6 including a second spring connected to said linearly moving member for urging said linearly moving member in a direction so that said pin so that said pin member contacts said second lever.

8. The arrangement as defined in claim 7 including an elongated rod-shaped member linking the free end of said first lever with one end of said linearly moving member.

9. The arrangement as defined in claim 8 including a third spring connected to said free end of said first lever for urging said free end toward said linearly moving member.

10. The arrangement as defined in claim 1 including fric-tional means between said second lever and said rotatable member for holding said rotatable member stationery through frictional force applied by said second lever.

* * * * *